(12) United States Patent
Kawamoto

(10) Patent No.: US 9,285,852 B2
(45) Date of Patent: Mar. 15, 2016

(54) INFORMATION PROCESSOR AND A BATTERY MANAGEMENT METHOD FOR INFORMATION PROCESSORS

(71) Applicant: Toshiba Tec Kabushiki Kaisha, Tokyo (JP)

(72) Inventor: Tsutomu Kawamoto, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 438 days.

(21) Appl. No.: 13/732,992

(22) Filed: Jan. 2, 2013

(65) Prior Publication Data
US 2013/0232370 A1 Sep. 5, 2013

(30) Foreign Application Priority Data
Mar. 2, 2012 (JP) .................................. 2012-046752

(51) Int. Cl.
*G06F 1/26* (2006.01)
*H04N 1/00* (2006.01)

(52) U.S. Cl.
CPC ............ *G06F 1/263* (2013.01); *H04N 1/00885* (2013.01)

(58) Field of Classification Search
CPC ........................... G06F 1/263; H04N 1/00885
See application file for complete search history.

(56) References Cited

U.S. PATENT DOCUMENTS

| 6,091,909 | A | * | 7/2000 | McIntyre et al. | 396/278 |
| 7,343,496 | B1 | * | 3/2008 | Hsiang et al. | 713/194 |
| 7,551,098 | B1 | * | 6/2009 | Chock et al. | 340/660 |
| 7,837,110 | B1 | * | 11/2010 | Hess et al. | 235/449 |
| 7,953,989 | B1 | * | 5/2011 | Hsiang et al. | 713/194 |

FOREIGN PATENT DOCUMENTS

| JP | 61-246820 A | 11/1986 |
| JP | 63-221421 A | 9/1988 |
| JP | 04-020127 A | 2/1992 |
| JP | 2002-199600 A | 7/2002 |
| JP | 2004-032881 A | 1/2004 |
| JP | 2004-178434 A | 6/2004 |
| JP | 2005-025324 | 1/2005 |

OTHER PUBLICATIONS

Japanese Office Action, Patent Application No. 2012-046752, dated Jan. 14, 2014.

* cited by examiner

*Primary Examiner* — M Elamin
(74) *Attorney, Agent, or Firm* — Patterson & Sheridan, LLP

(57) ABSTRACT

According to one embodiment, an information processor is equipped with an information processor terminal that contains a main control unit that processes information, an IO control unit that supplies electrical power to connected equipment (peripheral devices) and that controls communications, and a power supply unit that supplies electrical power, as well as a first switching circuit that connects a plurality of batteries and supplies electrical power to the main control unit, a second switching circuit that connects a plurality of batteries and supplies electrical power to the IO control unit, and a battery unit that contains a battery control part that controls the first switching circuit and the second switching circuit.

20 Claims, 3 Drawing Sheets

INFORMATION PROCESSOR AND A BATTERY MANAGEMENT METHOD FOR INFORMATION PROCESSORS

CROSS-REFERENCE TO RELATED APPLICATION

This application is based upon and claims the benefit of priority from Japanese Patent Application No. 2012-046752, filed Mar. 2, 2012; the entire contents of which are incorporated herein by reference.

FIELD

Embodiments described herein relate generally to an information processor and a battery management method for information processors.

BACKGROUND

Traditionally, information processors such as POS terminals (Point of Sales Terminals) and KIOSK terminals have run on external power sources.

However, in recent years, the need to use them in situations where external power sources are not readily available has been on the rise. To satisfy this need, the development of battery-run information processors has proceeded.

These battery-run information processors typically must also provide electrical power not only for running the information processor unit itself but also for equipment that is connected to the information processor, such as thermal printers or other peripheral devices. This connected equipment can require a relatively large amount of electrical power. Therefore, it is necessary to design the battery so that it can provide a relatively large amount of electrical power.

A technology has been proposed to connect a plurality of batteries to POS terminals. That is, just increase the number and/or size of the batteries connected to the terminal. However, when adopting this solution both the information processor terminal and the connected equipment (peripheral device(s)) will no longer be supplied with power when the connected batteries lose power. Specifically, when the batteries start to run down, it would be desirable to prioritize the supply of electrical power to the processor unit itself rather than to the printer/peripheral unit in order to complete, for example, an accounting processing.

Furthermore, as another drawback to this technology, when the batteries lose power, it is necessary to disengage them from the system in order to replace them.

Therefore, information processors and a battery management method for information processors that can be operated continuously for longer periods of time are needed.

DETAILED DESCRIPTION

In general, according to one embodiment, an information processor is provided which is equipped with an information processor terminal that contains a main control unit that processes information, an IO (input/output) control unit that supplies electrical power to connected equipment and that controls communications to connected equipment, and a power supply unit that supplies electrical power. The information processor terminal is equipped with a battery unit that contains a first power supply circuit that supplies power supplied from a first battery to the main control unit and a second power supply circuit that supplies electrical power supplied by a second battery to the IO control unit.

An information processor and a battery management method for information processors are described in detail below with reference to the drawings.

The information processor of this embodiment is equipped with an information processor terminal that contains a main control unit that processes information, an IO control unit that supplies electrical power to connected equipment and that controls communications, and a power supply unit that supplies electrical power. The information processor of this embodiment is also equipped with a battery unit that contains a first power supply circuit that supplies power supplied from a first battery to the main control unit and a second power supply circuit that supplies electrical power supplied by a second battery to the IO control unit.

A method of managing the battery power supply system of an information processor involves selecting a battery from a first group of batteries to supply electrical power to a main control unit via a first power supply circuit. Then selecting another battery from a second group of batteries to supply electrical power to the IO control unit via a second power supply circuit. When the voltage of the battery supplying the main control unit is detected to below some predetermined threshold value, a battery control unit controls the first power supply circuit to select a different battery from the first group of batteries to supply electrical power to the main control unit. If no battery in the first group of batteries has a voltage greater than or equal to the threshold value, then battery control unit controls the second power supply circuit to select a battery from the second group of batteries to be utilized to supply electrical power to the main control unit. The battery control unit gives the IO control unit priority over the main control unit for at least electrical power supplied by at least one battery in the second group of batteries, so that peripheral devices may be supplied with electrical power.

Figure 1:
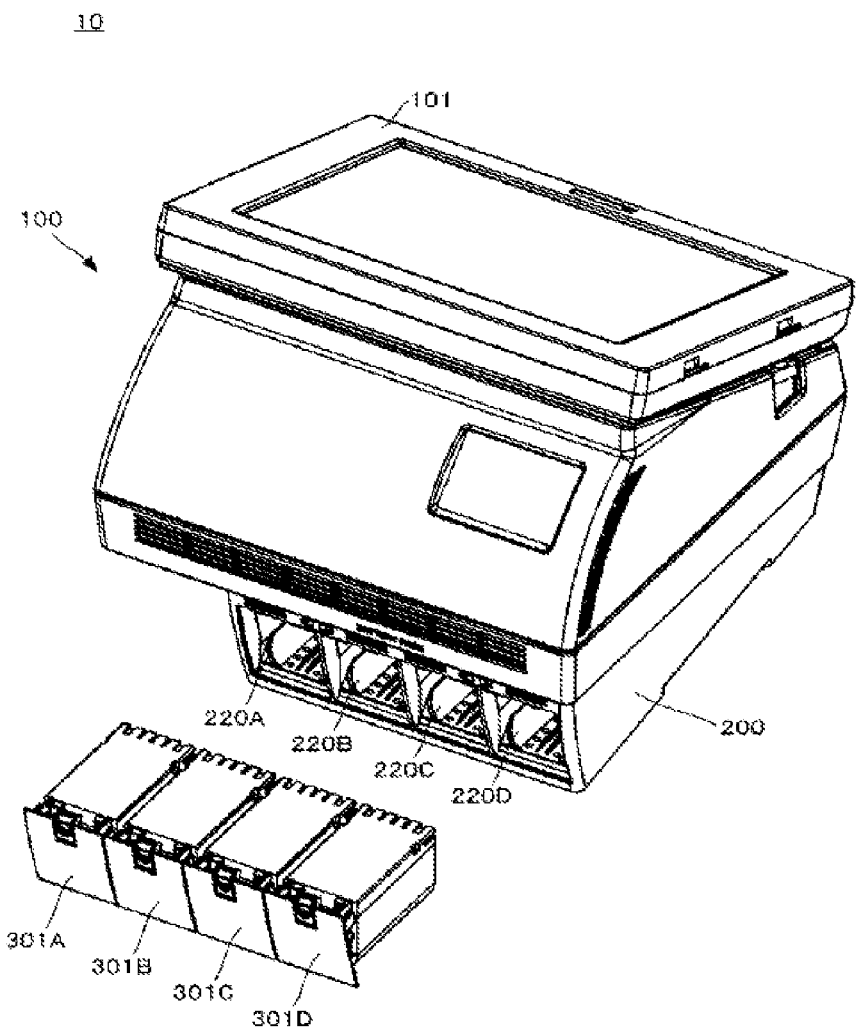
FIG. 1 is a rear perspective diagram of an information processor.
Figure 2:
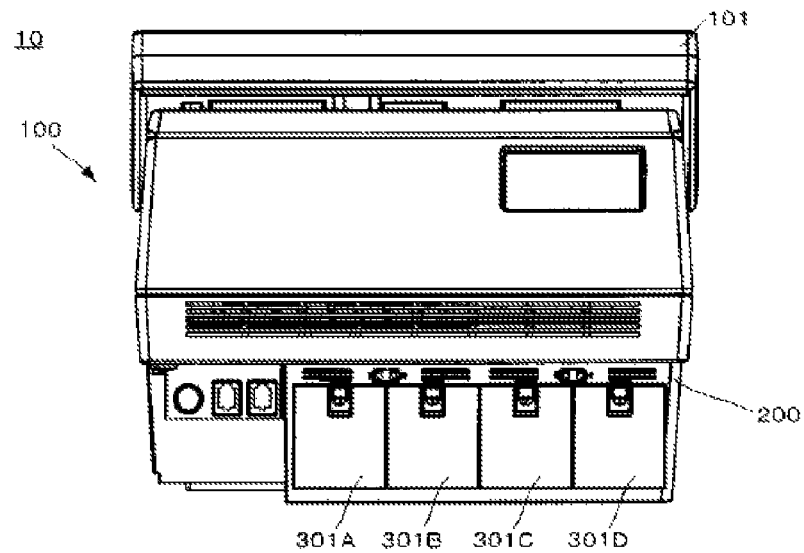
FIG. 2 is a rear view of the information processor.

FIG. 1 is a rear perspective diagram of an information processor 10 of this embodiment. FIG. 2 is a rear view of the information processor 10 in which batteries 301A-301D have been installed. Here, the information processor 10 may be a so-called POS terminals (Point of Sales Terminal) or KIOSK terminals (street installed multifunction information processors).

As shown in FIG. 1 and FIG. 2, the information processor 10 is equipped with an information processor terminal 100, a touch panel 101, and a battery unit 200.

The battery unit 200 is detachable from the information processor terminal 100.

When the information processor 10 is a POS terminal, the information processor 10 can be connected to equipment such as a printer 112, a drawer 113, and an expansion display 114, etc. A drawer 113 may be a means for distributing items to a terminal user, such as, for example, a coin dispenser for providing coins to make change. A drawer 113 may also be a means for allowing a user to deposit items into the terminal, such as, for example making payments.

Furthermore, when the information processor 10 is a KIOSK terminal, there can be models that do not contain a keyboard.

Figure 3:
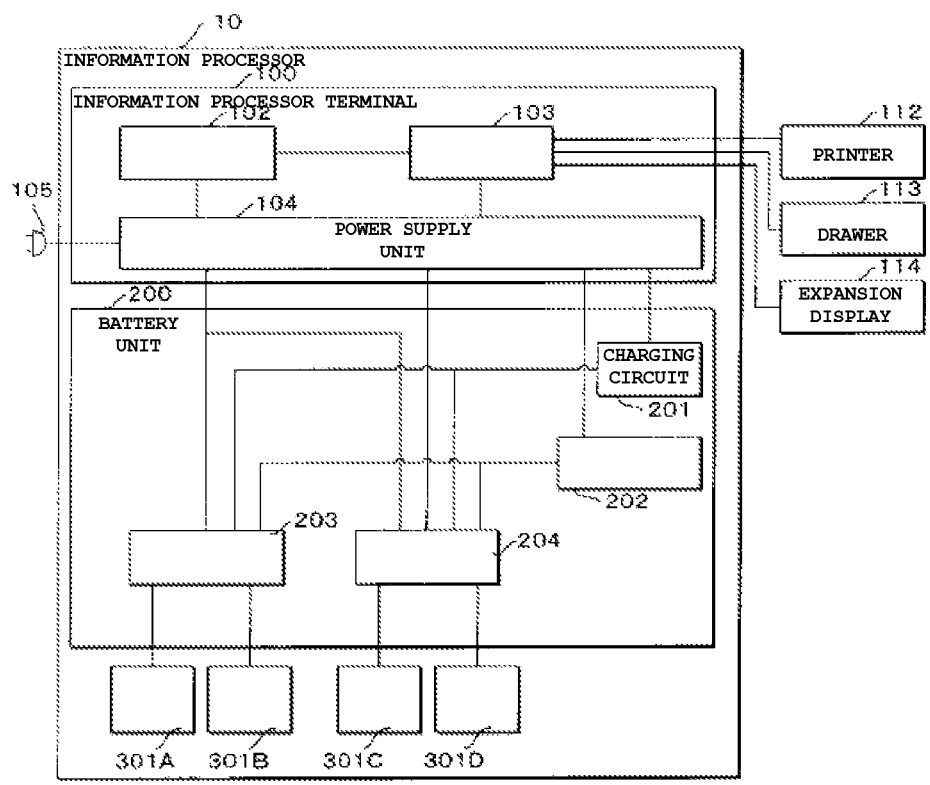
FIG. 3 is a block diagram that shows a composition of the information processor.

As shown in FIG. 1, the battery unit 200 can, for example, be equipped with a battery connector unit (220A through 220D) to connect a plurality of batteries (301A through 301D) in the rear. The batteries (301A through 301D) are each detachable from the battery connector units 220A through 220D FIG. 3 is a block diagram that shows the composition of the information processor 10. As shown in the figure, the information processor 10 is equipped with the information processor terminal 100, the battery unit 200 that is detachable from the information processor terminal 100, and a plurality of batteries (301A through 301D).

The information processor 10 is equipped with a main control unit 102 that processes information, an IO control unit 103 that controls the input/output of information, and a power supply unit 104 that supplies electrical power.

The main control unit 102 is equipped with a CPU that is an arithmetic device, ROM that is a memory device, memory such as RAM, flash memory which is auxiliary storage, and nonvolatile storage such as hard disk drives.

The IO control unit 103 is equipped with a communications interface that can supply electrical power, such as a powered USB, a powered COM, etc. The IO control unit 103 connects to equipment such as the printer 112, the drawer 113, or the expansion display 114; in general, it supplies electrical power and conducts the communication with connected equipment.

The power supply unit 104 can be connected to an external power source 105 and provides electrical power to the main control unit 102 and the IO control unit 103.

The battery unit 200 is equipped with a first switching circuit 203 that switches the connection with the first battery 301A or the second battery 301B and a second switching circuit 204 that switches the connection with the third battery 301C or the fourth battery 301D, and is equipped with a battery control unit 202 that controls the switching of the first switching circuit 203 and the second switching circuit 204 as well as a charging circuit 201 that provides electrical power for charging to the batteries (first battery 301A to the fourth battery 301D).

The first switching circuit 203 provides electrical power that is supplied by the first battery 301A or the second battery 301B, to the main control unit 102 via the power supply unit 104.

The second switching circuit 204 supplies electrical power that is supplied by the third battery 301C or the fourth battery 301D to the IO control unit 103 via the power supply unit 104.

The second switching circuit 204 can supply electrical power that is supplied by the third battery 301C to the main control unit 102 as well.

The electrical power that is supplied by the fourth battery 301D is not supplied to the main control unit 102

When the power supply unit 104 is connected to the external power source 105, the charging circuit 201 supplies electrical power for charging to the batteries 301A through 301D.

The battery control unit 202 detects the voltage that shows the remaining battery level of the batteries 301A through 301D.

The battery control unit 202 controls the switching of the first switching circuit 203 and the second switching circuit 204 in the following way:

(i) When the voltage of the first battery 301A is greater than or equal to a predetermined threshold value, it controls the first switching circuit 203 so that electrical power from the first battery 301A is supplied to the main control unit 102.

(ii) When the voltage of the first battery 301A is below the threshold and the voltage of the second battery 301B is greater than or equal to the threshold value, it controls the first switching circuit 203 so that the electrical power from the second battery 301B is supplied to the main control unit 102.

(iii) When the voltage of the first battery 301A and the voltage of the second battery 301B are below the threshold value and the voltage of the third battery 301C is greater than or equal to the threshold value, it controls the first switching circuit 203 and the second switching circuit 204 so that electrical power from the third battery 301C is supplied to the main control unit 102.

(iv) When the voltage of the fourth battery 301D is greater than or equal to the threshold value, it controls the second switching circuit 204 so that the fourth battery 301D, in priority over the third battery, will supply electrical power to the IO control unit 103.

It should be noted that the threshold value set for each battery need not be the same value. Each battery may have a different threshold value.

Figure 4:
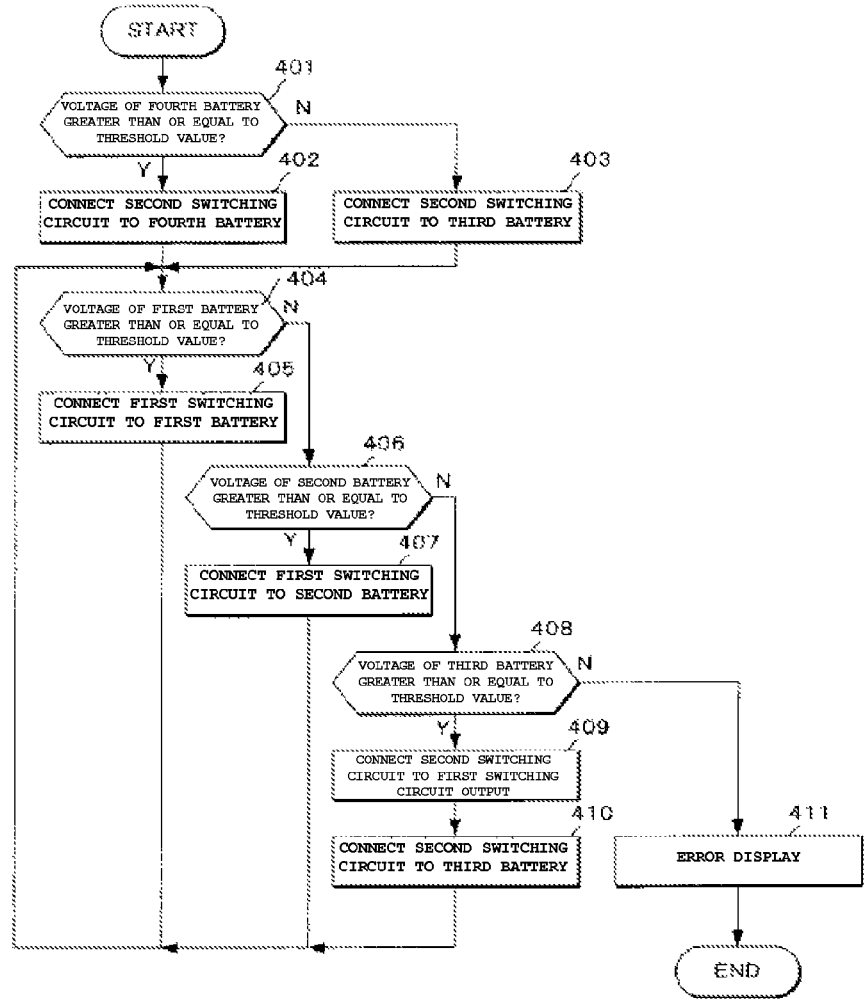
FIG. 4 is a flowchart that shows a function of a battery control unit.

FIG. 4 is a flow chart that shows the function of the battery control unit 202. As shown in FIG. 4, in the function 401, the battery control unit 202 determines whether the voltage of the fourth battery 301D is greater than or equal to the threshold value. When the battery control unit 202 determines that the voltage of the fourth battery 301D is greater than or equal to the threshold value, it will move on to the function 402, and when it determines that it is not greater than or equal to the threshold value, it will move on to the function 403.

In the function 402, the battery control unit 202 controls the second switching circuit 204 and connects to the fourth battery 301D, and also supplies the electrical power from the fourth battery 301D to the IO control unit 103.

In the function 403, the battery control unit 202 controls the second switching circuit 204 and connects to the third battery 301C, and also supplies the electrical power form the third battery 301C to the IO control unit 103.

In the function 404, the battery control unit 202 determines whether the voltage of the first battery 301A is greater than or equal to the threshold value. When the battery control unit 202 determines that the voltage of the first battery 301A is greater than or equal to the threshold value, it will move on to the function 405, and when it determines that it is not greater than or equal to the threshold value, it will move on to the function 406.

In the function 405, the battery control unit 202 controls the first switching circuit 203 and connects to the first battery 301A, and also supplies the electrical power from the first battery 301A to the main control unit 102, and goes back to the function 404.

In the function 406, the battery control unit 202 determines whether the voltage of the second battery 301B is greater than or equal to the threshold value. When the battery control unit 202 determines that the voltage of the second battery 301B is greater than or equal to the threshold value, it will move on to the function 407, and when it determines that it is not greater than or equal to the threshold value, it will move on to the function 408.

In the function 407, the battery control unit 202 controls the first switching circuit 203 and connects to the second battery 301B, and also supplies the electrical power form the second battery 301B to the main control unit 102, and goes back to the function 404.

In the function 408, the battery control unit 202 determines whether the voltage of the third battery 301C is greater than or equal to the threshold value. When the battery control unit 202 determines that the voltage of the third battery 301C is greater than or equal to the threshold value, it will move on to the function 409, and when it determines that it is not greater than or equal to the threshold value, it will move on to the function 411.

In the function 409, the battery control unit 202 controls the second switching circuit 204, and also connects its output to the output of the first switching circuit 203, which is connected to the power supply line of the main control unit 102.

In the function 410, the battery control unit 202 controls the second switching circuit 204 and connects to the third battery 301C, and also supplies the electrical power from the third battery 301C to the main control unit 102, then goes back to the function 404.

In the function 411, the battery control unit 202 will output the error display that is an alarm to show that the battery has run out of power. The error display can turn on the warning light that is contained in the battery unit 200, or to that effect it can show the display 101 of the information processor terminal 100.

As stated above, the information processor 10 of this embodiment is equipped with the information processor terminal 100 that contains the main control unit 102 that processes information, the IO control unit 103 that controls electrical power from the power supply unit 104 to the connected equipment and also controls communications, and is equipped with the battery unit 200 that contains the first switching circuit 203 that connects a plurality of batteries and supplies electrical power to the main control unit 102, as well as the second switching circuit 204 that connects a plurality of batteries and supplies electric power to the IO control unit 103, and the battery control unit 202 that controls the first switching circuit 203 and the second switching circuit 204.

Therefore, the information processor 10 of this embodiment make it possible to supply the main control unit 102 with electrical power preferentially from batteries that have a voltage that is greater than or equal to the threshold value, and has the effect that a longer, more stable operation becomes possible.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processor comprising:
  an information processor terminal that includes:
    a main control unit that processes information;
    an input/output control unit that supplies electrical power to equipment connected thereto and controls communications between the main control unit and the connected equipment; and
    a power supply unit that supplies electrical power to the main control unit and the input/output control unit; and
  a battery unit that includes:
    a first power supply circuit comprising a first battery unit that supplies electrical power to the main control unit through the power supply unit; and
    a second power supply circuit comprising a second battery unit that supplies electrical power to the input/output control unit through the power supply unit.

2. The information processor according to claim 1, wherein the first battery unit comprises a plurality of batteries,
  the first power supply circuit further comprises a first switching circuit that causes electrical power to be supplied from a battery selected from the plurality of batteries of the first battery unit to the main control unit through the power supply unit,
  the second battery unit comprises a plurality of batteries,
  the second power supply circuit further comprises a second switching circuit that causes electrical power to be supplied from a battery selected from the plurality of batteries of the second battery unit to the input/output control unit through the power supply unit, and
  the battery unit further comprises a battery control unit that controls the first switching circuit and the second switching circuit.

3. The information processor according to claim 2, wherein the second switching circuit further comprises a power supply connection by which power is supplied to the main control unit, and
  the battery control unit controls the first switching circuit and the second switching circuit when the voltages of any batteries of the first battery unit are below the threshold value to supply electrical power from a selected battery of the second battery unit to the main control unit through power supply connection.

4. The information processor according to claim 3, wherein the battery control unit further controls the first switching circuit and the second switching circuit to supply electrical power to the input/output control unit from the remaining batteries of the second battery unit.

5. The information processor according to claim 1, wherein the connected equipment includes a printer device, a drawer, or an expansion display.

6. The information processor according to claim 1, further comprising:
  a touch screen device connected to the input/output control unit.

7. The information processor according to claim 1, further comprising:
  a keyboard connected to the input/output control unit.

8. The information processor according to claim 1, wherein the batteries of the first and second battery units are detachable.

9. The information processor according to claim 1, wherein the main control unit comprises a central processing unit and one or more memory devices.

10. The information processor according to claim 1, wherein
  the power supply unit is also connectable to an external power source.

11. The information processor according to claim 10, wherein
  the battery unit further comprises a battery charging circuit that charges the batteries of the first and second battery units with power supplied from the power supply unit, when the power supply unit is connected to the external power source.

12. An information processor, comprising:
  a main control unit configured to process information;
  an input/output control unit configured to communicate with a connected equipment and to supply electric power to the connected equipment;
  a power supply unit configured to supply electric power to the main control unit and the input/output control unit;

a first switching circuit configured to cause electric power to be supplied from a first battery selected from a first plurality of batteries to the main control unit through the power supply unit;

a second switching circuit configured to cause electric power to be supplied from a second battery selected from a second plurality of batteries to the input/output control unit through the power supply unit, and from at least a third battery selected from the second plurality of batteries to the main control unit through the power supply unit; and a battery control unit configured to detect a battery voltage, wherein:

when the battery control unit detects that the battery voltage of the first battery is below a threshold voltage, the battery control unit controls the first switching circuit to supply electric power from a different battery with a battery voltage above or equal to the threshold value to the to the main control unit through the power supply unit, the different battery being selected from the first plurality of batteries, and if no battery in the first plurality of batteries has a battery voltage above or equal to the threshold value, then the battery control unit controls the second switching circuit to supply electric power from a selected battery in the second plurality of batteries to the to the main control unit through the power supply unit, the selected battery having a voltage above or equal to the threshold value, the selected battery being different from the second battery.

13. The information processor of claim 12, wherein the connected equipment is a drawer.

14. The information processor of claim 12, wherein the power supply unit is configured to be connected to an external power source.

15. The information processor of claim 14, further comprising:

a battery charging circuit connected to the power supply unit and the first and second switching circuits, for charging the first and second plurality of batteries.

16. The information processor of claim 12, further comprising:

a touch screen.

17. A battery management method for an information processor including a battery control unit, a first plurality of batteries, and a second plurality of batteries, the method comprising:

selecting a first battery from the first plurality of batteries to supply electrical power to a main control unit via a first power supply circuit;

selecting a second battery from the second plurality of batteries to supply electrical power to an input/output control unit via a second power supply circuit;

detecting a voltage of the first battery;

controlling the first power supply circuit to select a third battery from the first plurality of batteries to supply electrical power to the main control unit if the detected voltage of the first battery is below a threshold value, unless the voltage of the third battery is also below the threshold value; and controlling the second power supply circuit to select a fourth battery from the second plurality of batteries if no battery in the first plurality of batteries has a voltage greater than or equal to the threshold value, wherein the fourth battery is different from the second battery and is utilized to supply electrical power to the main control unit.

18. The method of claim 17, wherein
the battery control unit gives the input/output control unit priority over the main control unit for at least electrical power supplied by the second battery.

19. The method of claim 17, further comprising:

generating an alarm or error message when the voltage of any battery in the first or the second plurality of batteries is detected to be below the threshold voltage.

20. The method of claim 17, wherein the input/output control unit supplies power to one or more peripheral devices.

* * * * *